United States Patent
Silverbrook et al.

(10) Patent No.: US 6,565,193 B1
(45) Date of Patent: May 20, 2003

(54) COMPONENT FOR A FOUR COLOR PRINTHEAD MODULE

(75) Inventors: Kia Silverbrook, Balmain (AU); Tobin Allen King, Cremorne (AU); Garry Raymond Jackson, Haberfield (AU)

(73) Assignee: Silverbrook Research Pty Ltd, Balmain (AU)

( * ) Notice: Subject to any disclaimer, the term of this patent is extended or adjusted under 35 U.S.C. 154(b) by 184 days.

(21) Appl. No.: 09/692,813

(22) Filed: Oct. 20, 2000

(30) Foreign Application Priority Data

Dec. 9, 1999 (AU) .............................................. PQ4559

(51) Int. Cl.[7] .................................................. B41J 2/14
(52) U.S. Cl. ....................................................... 347/50
(58) Field of Search ................................ 347/68, 50, 20

(56) References Cited

U.S. PATENT DOCUMENTS

| 6,095,643 | A  | * | 8/2000 | Cook et al. | .................... 347/87 |
| 6,170,931 | B1 | * | 1/2001 | Anderson et al. | ............. 347/17 |
| 2001/0006393 | A1 | * | 7/2001 | Kline et al. | .................... 347/50 |
| 2002/0122098 | A1 | * | 9/2002 | Sekiya | ........................ 347/50 |

FOREIGN PATENT DOCUMENTS

| EP | 611653 B1 | 8/1994 |
| JP | 08-085213 | 4/1996 |

* cited by examiner

*Primary Examiner*—Judy Nguyen

(57) ABSTRACT

A component for a printhead module includes a printhead chip and a flexible printed circuit board (PCB) on which the chip is mounted. A carrier having fluid communication channels defined therein supplies ink to the chip. The PCB is bonded to the carrier in a liquid tight manner so that the PCB forms a wall of an ink supply chamber of the printhead module.

8 Claims, 15 Drawing Sheets

COMPONENT FOR A FOUR COLOR PRINTHEAD MODULE

FIELD OF THE INVENTION

This invention relates to a printhead assembly. More particularly, the invention relates to a pagewidth inkjet printhead assembly.

SUMMARY OF THE INVENTION

According to the invention there is provided a component for a printhead module, the component including a printhead chip;

a flexible printed circuit board (PCB) on which the chip is mounted; and a carrier having fluid communication channels defined therein for supplying ink to the chip, the PCB being bonded to the carrier in a liquid tight manner so that the PCB forms a wall of an ink supply chamber of the printhead module.

In this specification, the term "wall" is to be understood in a broad sense, unless the context clearly indicates otherwise, to include any part of a structure including its floor and roof or ceiling.

The chip may be a microelectromechanical chip comprised of a number of nozzles.

The flexible PCB may include a film member on which are arranged a plurality of electrically conductive pathways, contacts and connections for providing power and data signals to the chip. The film may be a Tape Automated Bond (TAB) film.

The carrier, with the flexible PCB bonded thereto, may form a floor of the ink supply chamber.

The carrier may be a rigid structure having flow paths defined therein. The carrier may comprise a frame from which a plurality of ribs extend to define a pair of opposed comb-like structures and a central, longitudinally extending channel between the structures in which the chip is received.

The chip may be bonded sealingly to the flexible PCB on both sides of the PCB.

BRIEF DESCRIPTION OF THE DRAWINGS

The invention is now described by way of example with reference to the accompanying drawings in which.

DETAILED DESCRIPTION OF THE DRAWINGS

Figure 1:
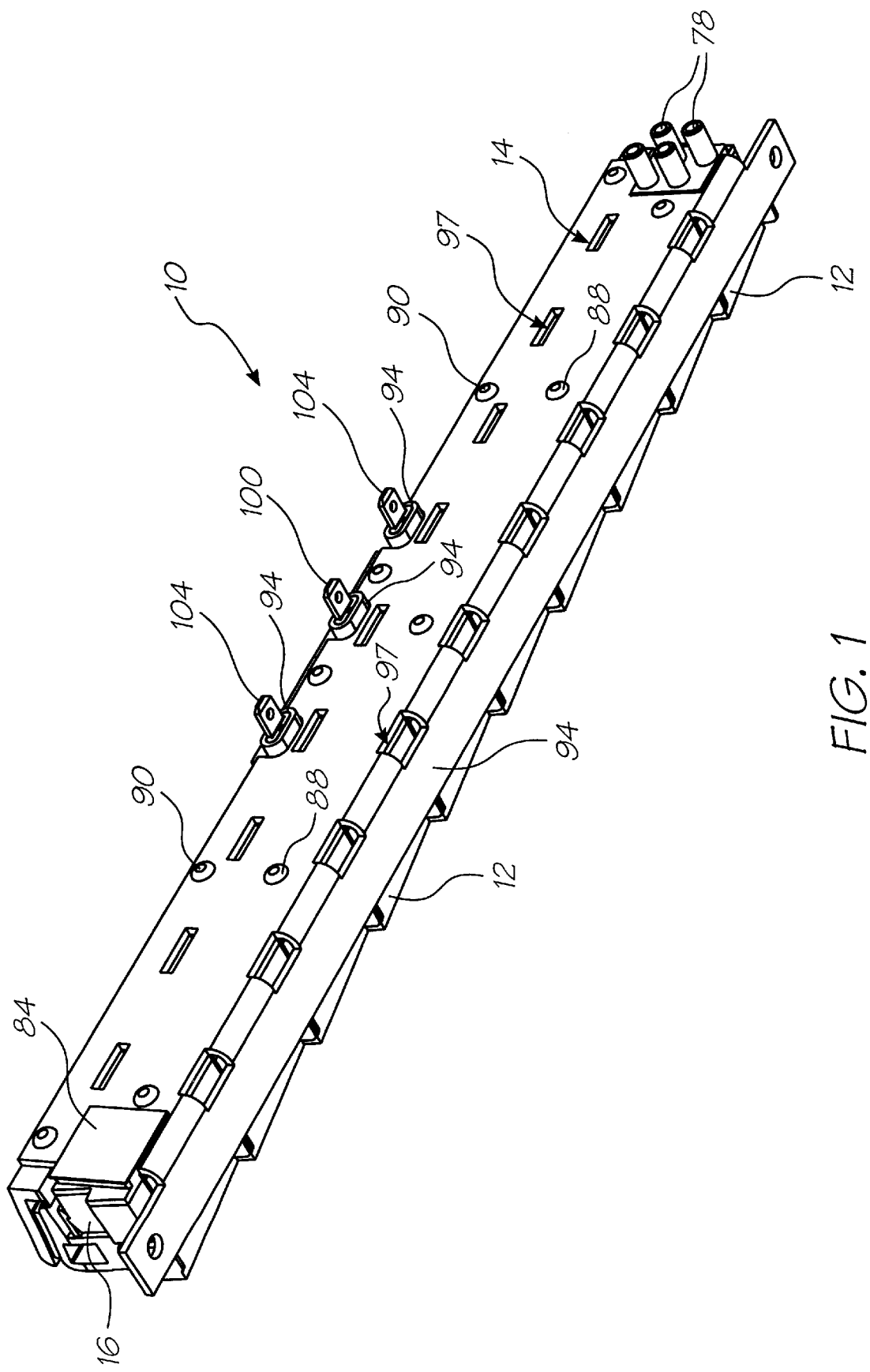
FIG. 1 shows a three dimensional view, from above, of a printhead assembly, in accordance with the invention.

A printhead assembly, in accordance with the invention is designated generally by the reference numeral 10. The assembly 10 uses a plurality of replaceable printhead modules 12. The advantage of this arrangement is the ability to easily remove and replace any defective modules 12 in the assembly 10. This eliminates having to scrap an entire printhead assembly 10 if only one module 12 is defective.

The assembly 10 comprises a chassis 14 on which an ink reservoir 16 is secured. The printhead modules 12 are, in turn, attached to the reservoir 16.

Each printhead module 12 is comprised of a mircroelectromechanical (Memjet) chip 18 (shown most clearly in FIG. 8 of the drawings) bonded by adhesive 20 to a flexible circuit connecrtor in the form of a Tape Automated Bond (TAB) film 22, the TAB film 22 being electrically connected to the chip 18. The chip 18 and the TAB film 22 form a sub-assembly 24 which is attached to a micromolding 26. The micromolding 26 is, in turn, supported on a cover modling 28.

Figure 3:
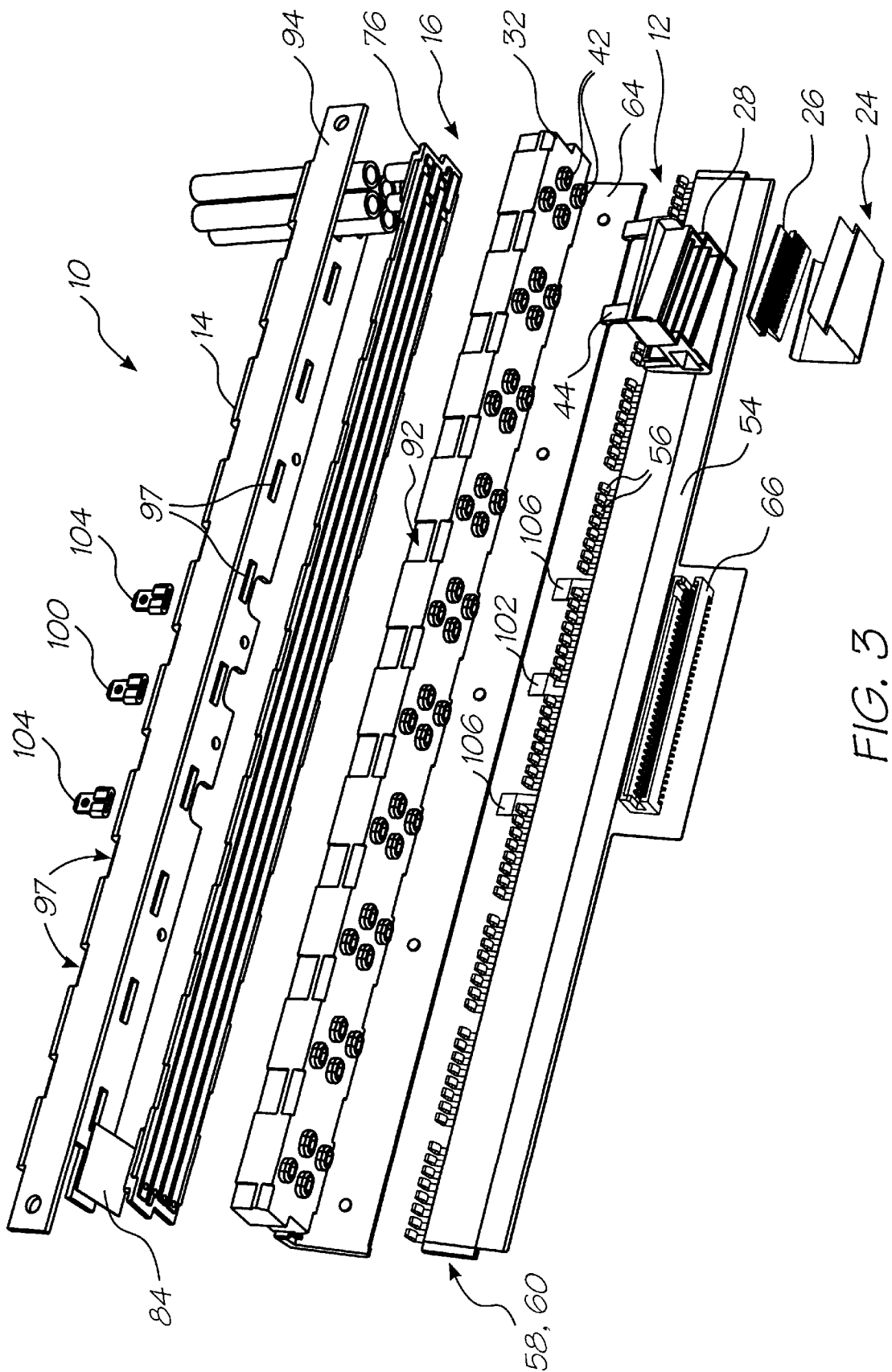
FIG. 3 shows a three dimensional, exploded view of the assembly.

Each module 12 forms a sealed unit with four independent ink chambers 30 defined in the cover molding 28, the ink chambers 30 supplying ink to the chip 18. Each printhead module 12 is plugged into a reservoir molding 32 (shown most clearly in FIGS. 3 and 7 of the drawings) of the ink reservoir 16 that supplies the ink. Ten modules 12 butt together into the reservoir 16 to form a complete 8 inch printhead assembly 10. The ink reservoirs 16 themselves are modular, so complete 8 inch printhead arrays can be configured to form a printhead assembly 10 of a desired width.

The 8 inch modular printhead assembly 10, according to the invention, is designed for a print speed and inkflow rate that allows up to 160 pages per minute printing at 1600 dpi photographic quality. Additionally, a second printhead assembly, of the same construction, can be mounted in a printer on the opposite side for double sided high speed printing.

As described above, and as illustrated most clearly in FIG. 8 of the drawings, at the heart of the printhead assembly 10 is the Memjet chip 18. The TAB film 22 is bonded on to the chip 18 and is sealed with the adhesive 20 around all edges of the chip 18 on both sides. This forms the core Memjet printhead chip sub-assembly 24.

Figure 11:
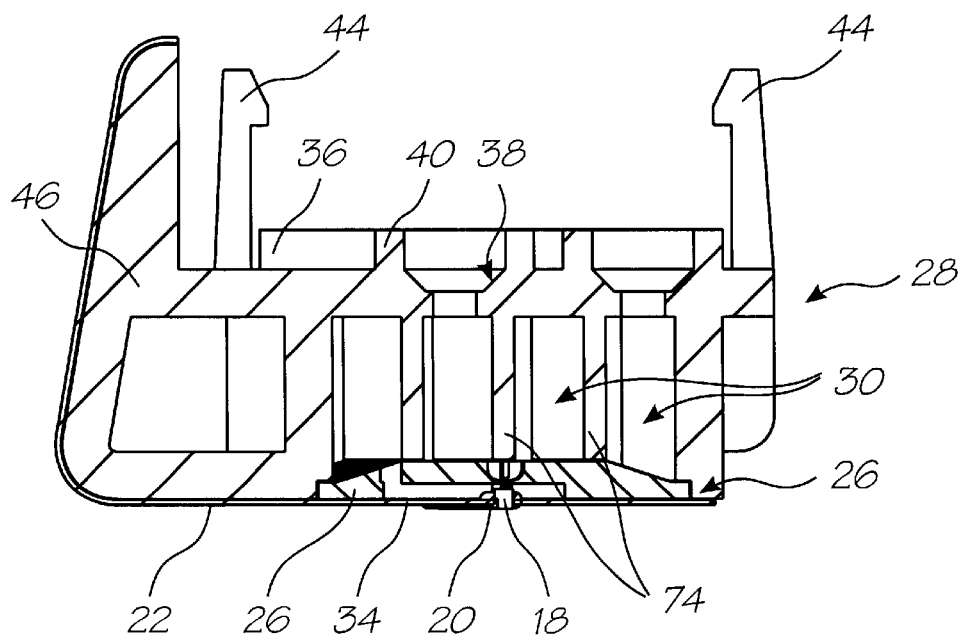
FIG. 11 shows a sectional end view of the module taken along line XI—XI in FIG. 10.

The sub-assembly 24 is bonded on to the micromolding 26. This molding 26 mates with the TAB film 22 which, together, form a floor 34 (FIG. 11) of the ink chambers 30 of the cover molding 28. The chambers 30 open in a flared manner in a top 36 of the cover molding 28 to define filling funnels 38. A soft elastomeric, hydrophobic collar 40 is arranged above each funnel 38. The collars 40 sealingly engage with complementary filling formations or nozzles 42 (FIG. 7) of the reservoir molding 32 of the ink reservoir 16 to duct ink to the chip 18.

Snap details or clips 44 project from the top 36 of the cover molding 28 to clip the cover molding 28 releasably to the ink reservoir 16.

Figure 8:
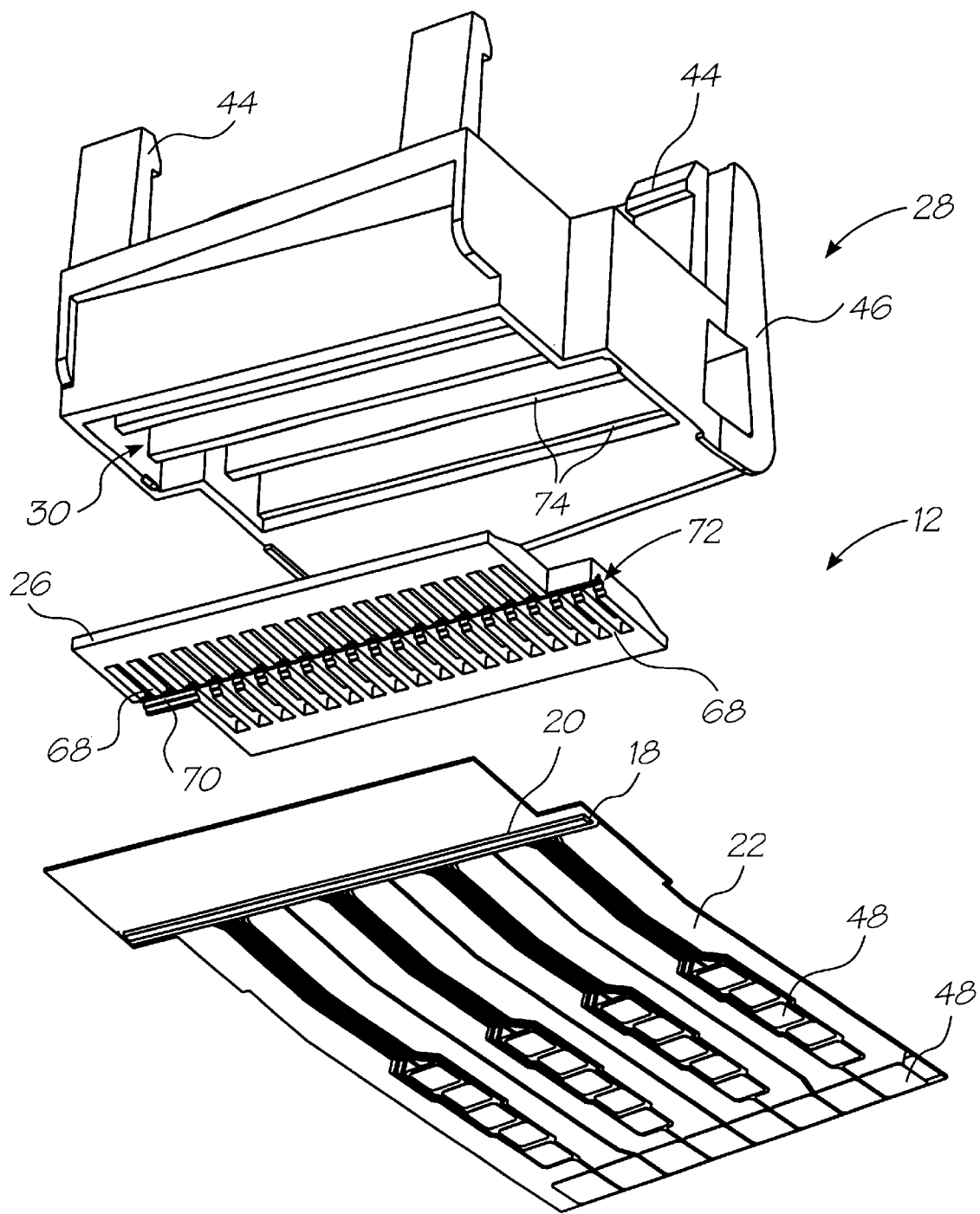
FIG. 8 shows a three dimensional, exploded view of a printhead module of the assembly.
Figure 9:
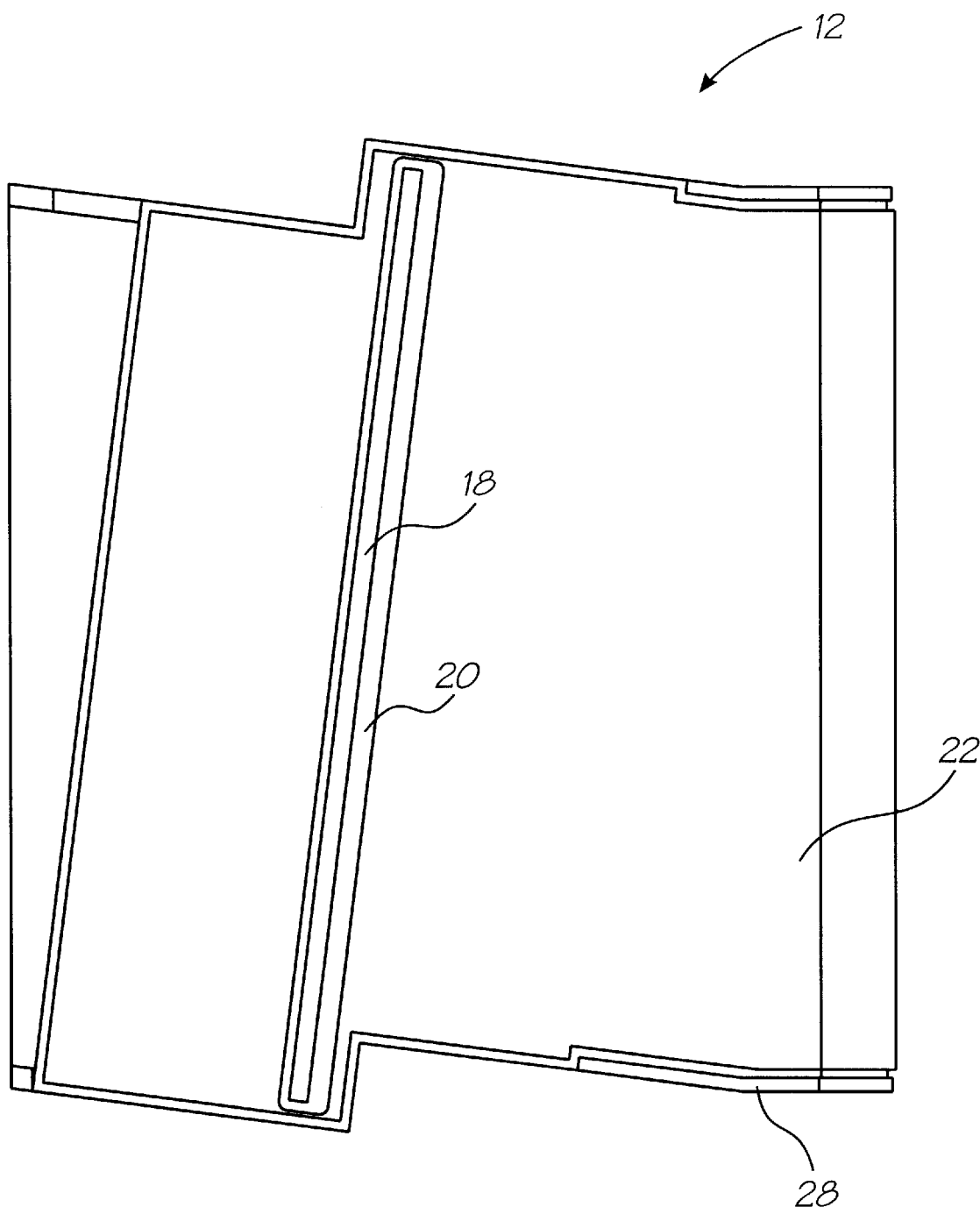
FIG. 9 shows a bottom view of the module.
Figure 10:
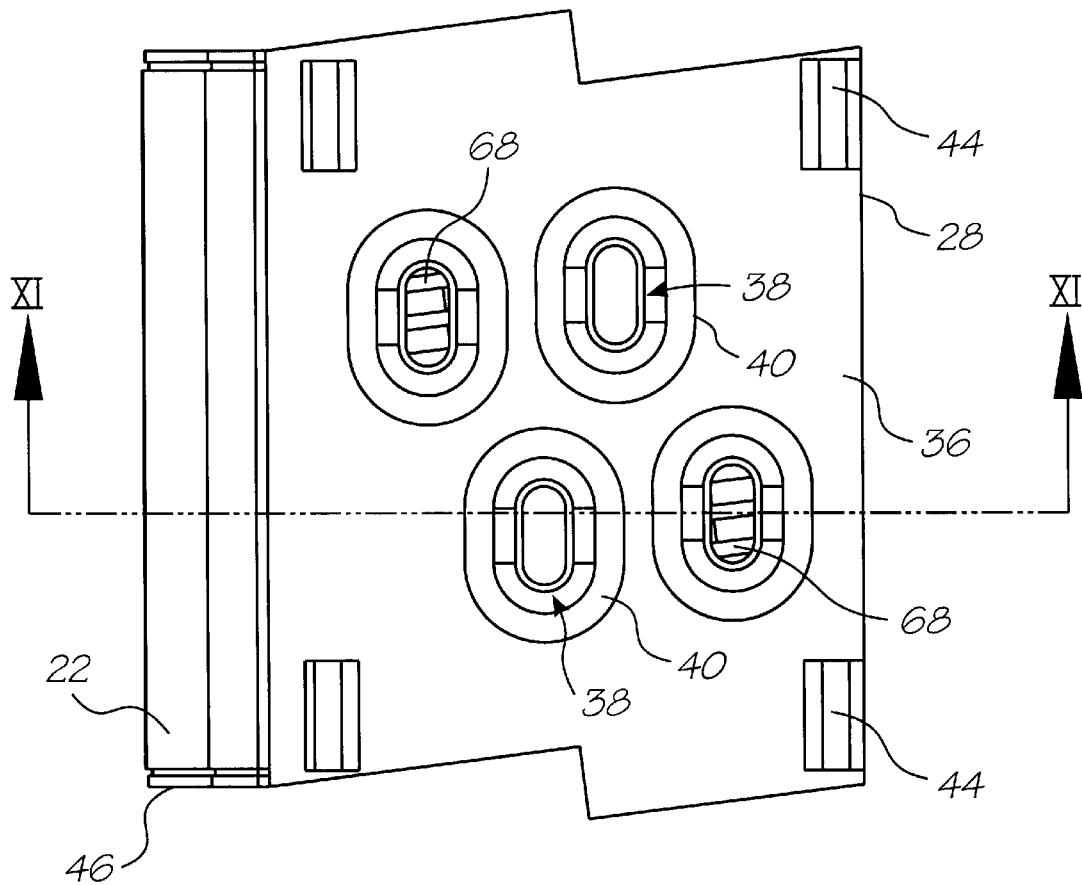
FIG. 10 shows a plan view of the module.

The TAB film 22 extends up an angled side wall 46 of the cover molding 28 where it is also bonded in place. The side wall 46 of the cover molding 28 provides the TAB film 22 with a suitable bearing surface for data and power contact pads 48 (FIG. 8).

The sub-assembly 24, the micromolding 26 and the cover molding 28 together form the Memjet printhead module 12. A plurality of these printhead modules 12 snap fit in angled, end-to-end relationship on to the ink reservoir 16. The reservoir 16 acts as a carrier for the modules 12 and provides ink channels 80 (FIG. 7) for four ink colors, Cyan, Magenta, Yellow and black (CMYK). The four ink colors are channelled through the individual funnels 38 of the cover molding 28 into each printhead module 12.

Figure 2:
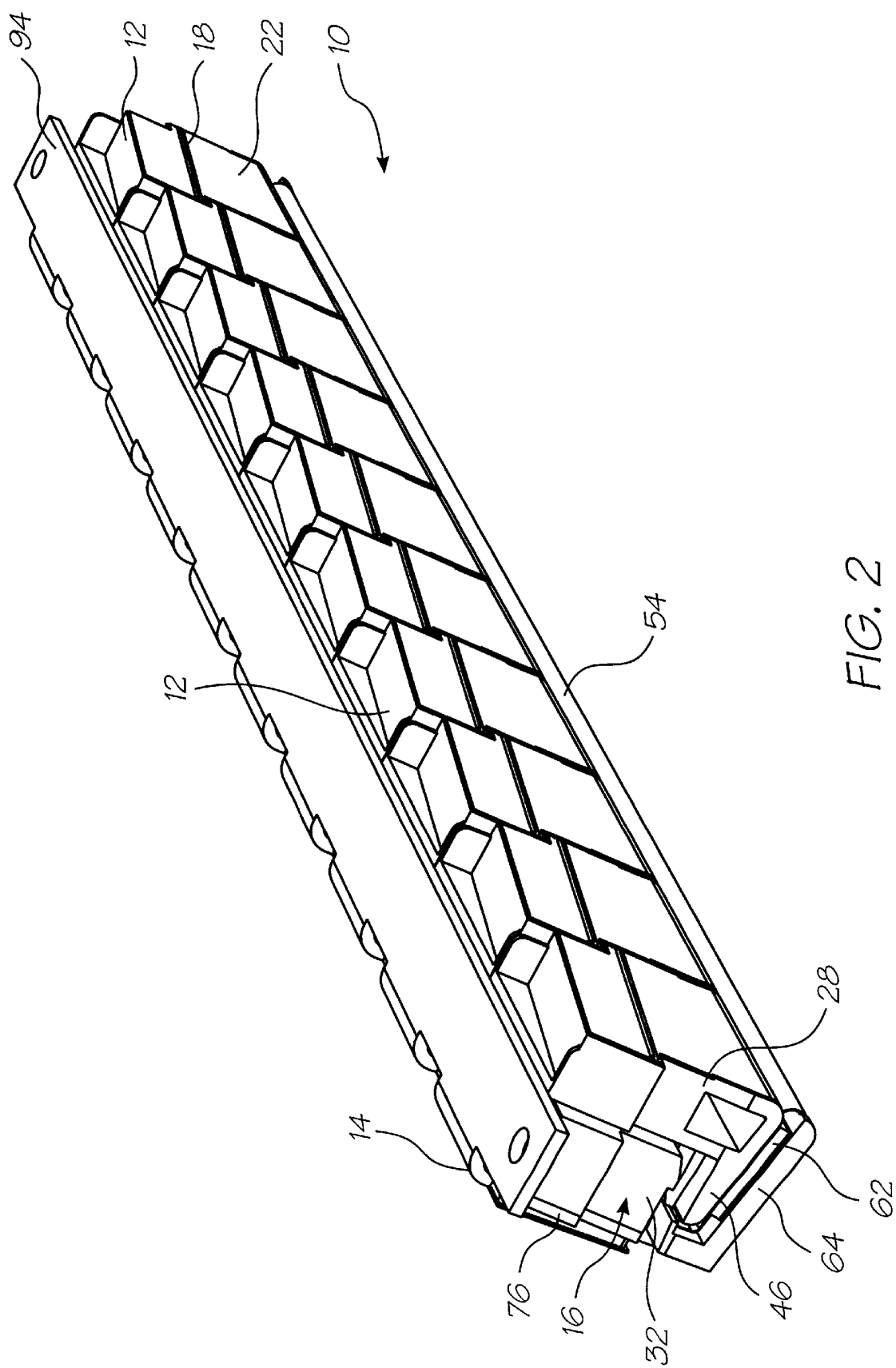
FIG. 2 shows a three dimensional view, from below, of the assembly.
Figure 4:
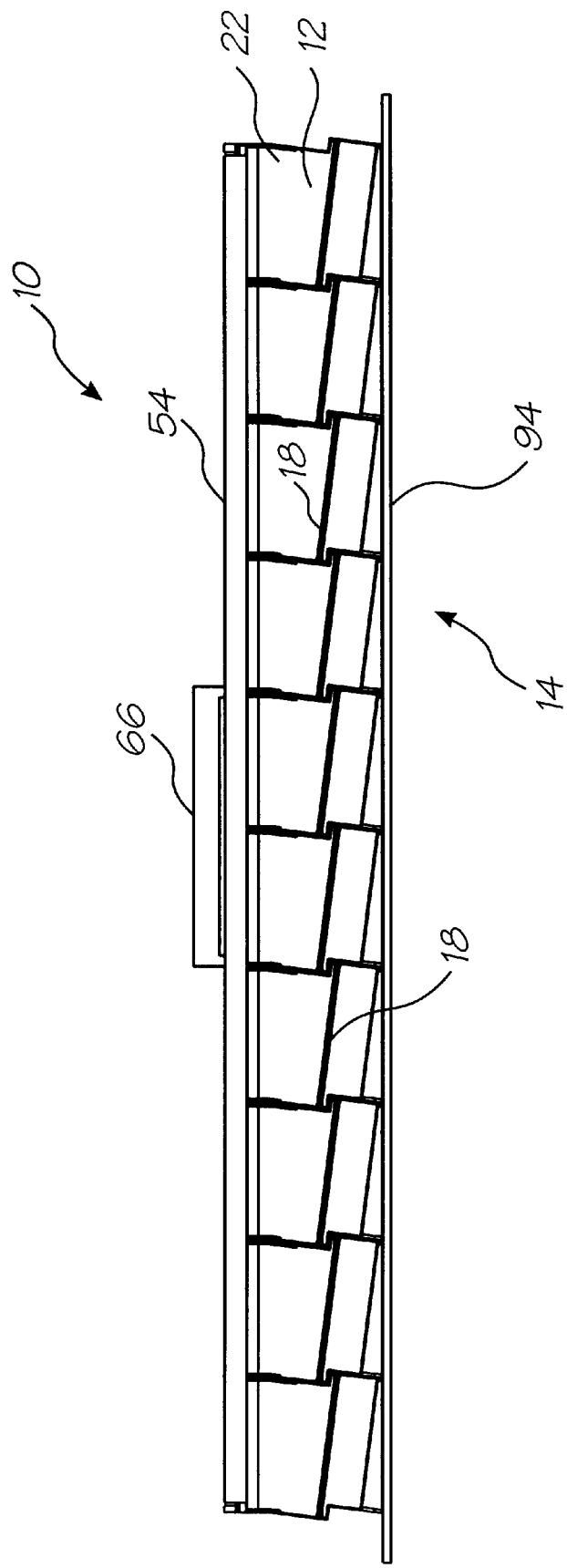
FIG. 4 shows a bottom view of the assembly.
Figure 5:
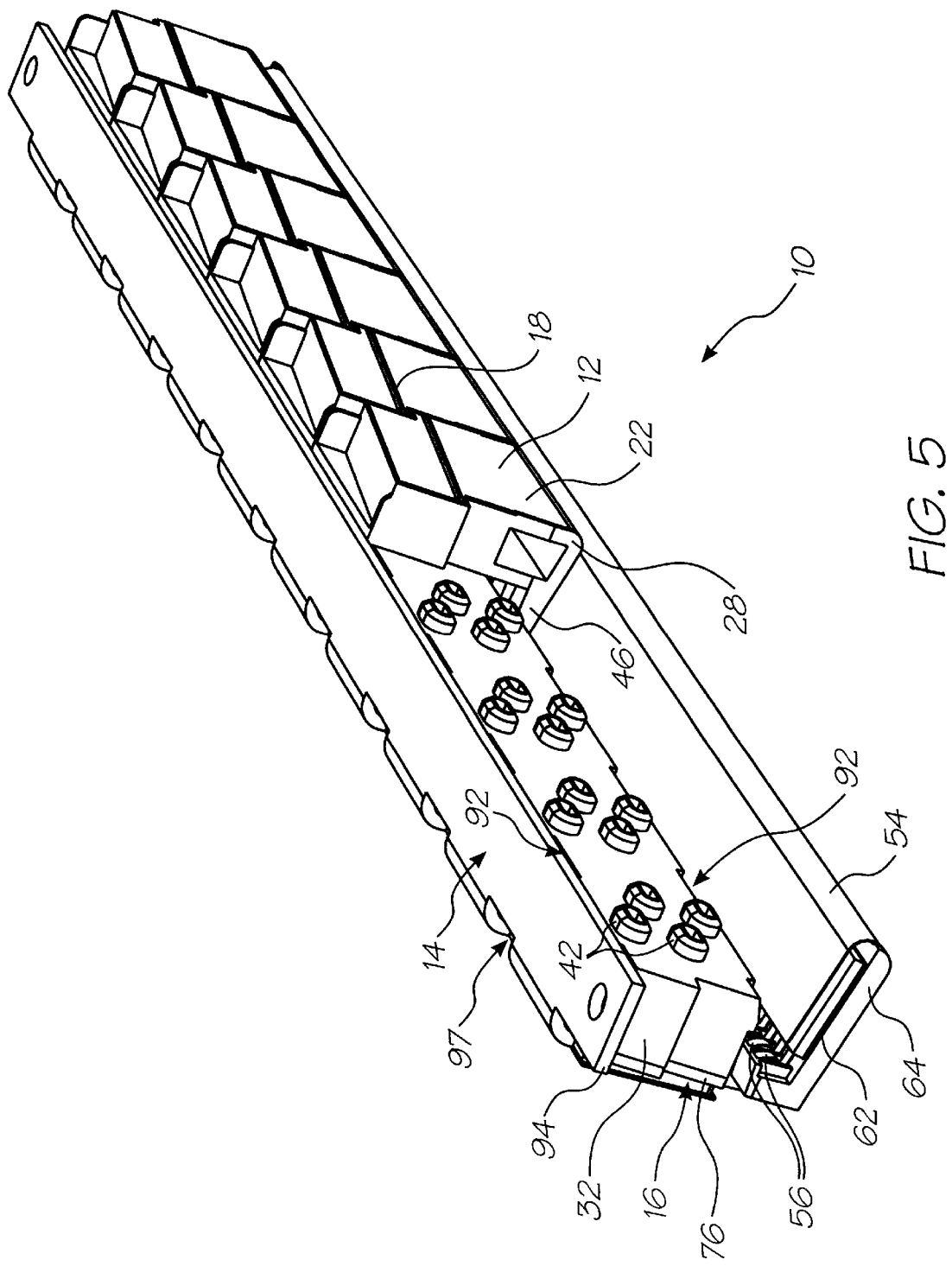
FIG. 5 shows a three dimensional view, from below, of the assembly with parts omitted.
Figure 6:
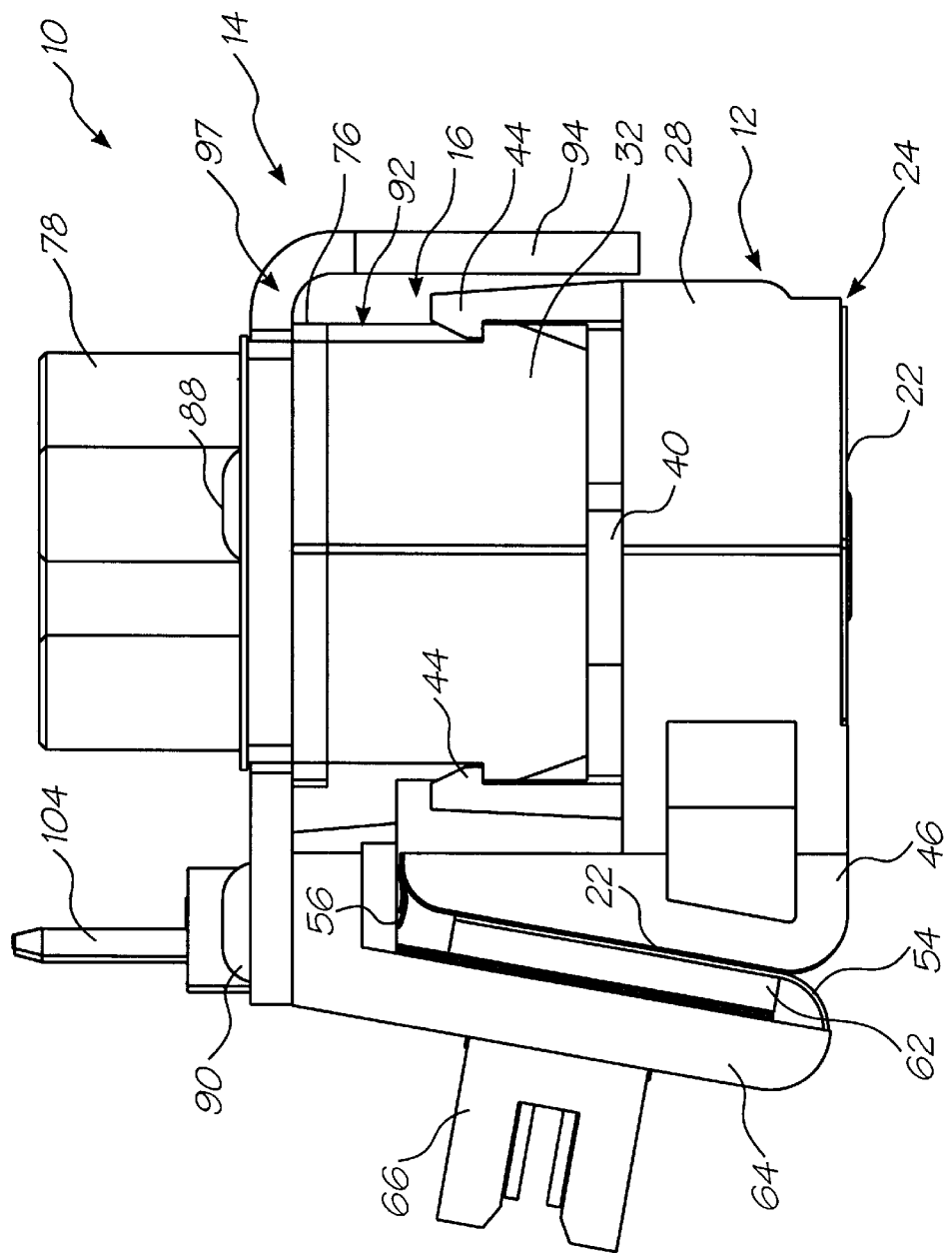
FIG. 6 shows, on an enlarged scale, an end view of the assembly.

The printhead modules 12 butt up to one another in an overlapping, angled fashion as illustrated most clearly in FIGS. 2 and 4 of the drawings. This is to allow the Memjet chips 18 to diagonally overlap in order to produce continuous printhead lengths from 0.8 inches to 72 inches (for wide format printers) and beyond.

The Memjet chip 18 is 21.0 mm long×0.54 mm wide and 0.3 mm high. A protective silicon nozzle shield that is 0.3 mm high is bonded to the upper surface of the Memjet chip 18.

Each Memjet nozzle includes a thermoelastic actuator that is attached to a moving nozzle assembly. The actuator has two structurally independent layers of titanium nitride (TiN) that are attached to an anchor on the silicon substrate at one end and a silicon nitride (nitride) lever arm/nozzle assembly at the other end. The top TiN or "heater" layer forms an electrical circuit which is isolated from the ink by nitride. The moving nozzle is positioned over an ink supply channel that extends through the silicon substrate. The ink supply channel is fluidically sealed around the substrate holes periphery by a TiN sealing rim. Ink ejection is prevented between the TiN rim and the nitride nozzle assembly by the action of surface tension over a 1 micron gap.

A 1 microsecond 3V, 27 mA pulse (85 nanojoules) is applied to the terminals of the heater layer, increasing the heater temperature by Joule heating. The transient thermal field causes an expansion of the heater layer that is structurally relieved by an "out of plane" deflection caused by the presence of the other TiN layer.

Deflection at the actuator tip is amplified by the lever arm and forces the nozzle assembly towards the silicon ink supply channel. The nozzle assembly's movement combines with the inertia and viscous drag of the ink in the supply channel to generate a positive pressure field that causes the ejection of a droplet.

Memjet actuation is caused by a transient thermal field. The passive TiN layer only heats up by thermal conduction after droplet ejection. Thermal energy dissipates by thermal conduction into the substrate and the ink, causing the actuator to return to the 'at rest' position. Thermal energy is dissipated away from the printhead chip by ejected droplets. The drop ejection process takes around 5 microseconds. The nozzle refills and waste heat diffuses within 20 microseconds allowing a 50 KHz drop ejection rate.

The Memjet chip 18 has 1600 nozzles per inch for each color. This allows true 1600 dpi color printing, resulting in full photographic image quality. A 21 mm CMYK chip 18 has 5280 nozzles. Each nozzle has a shift register, a transfer register, an enable gate, and a drive transistor. Sixteen data connections drive the chip 18.

Some configurations of Memjet chips 18 require a nozzle shield. This nozzle shield is a micromachined silicon part which is wafer bonded to the front surface of the wafer. It protects the Memjet nozzles from foreign particles and contact with solid objects and allows the packaging operation to be high yield.

Figure 13:
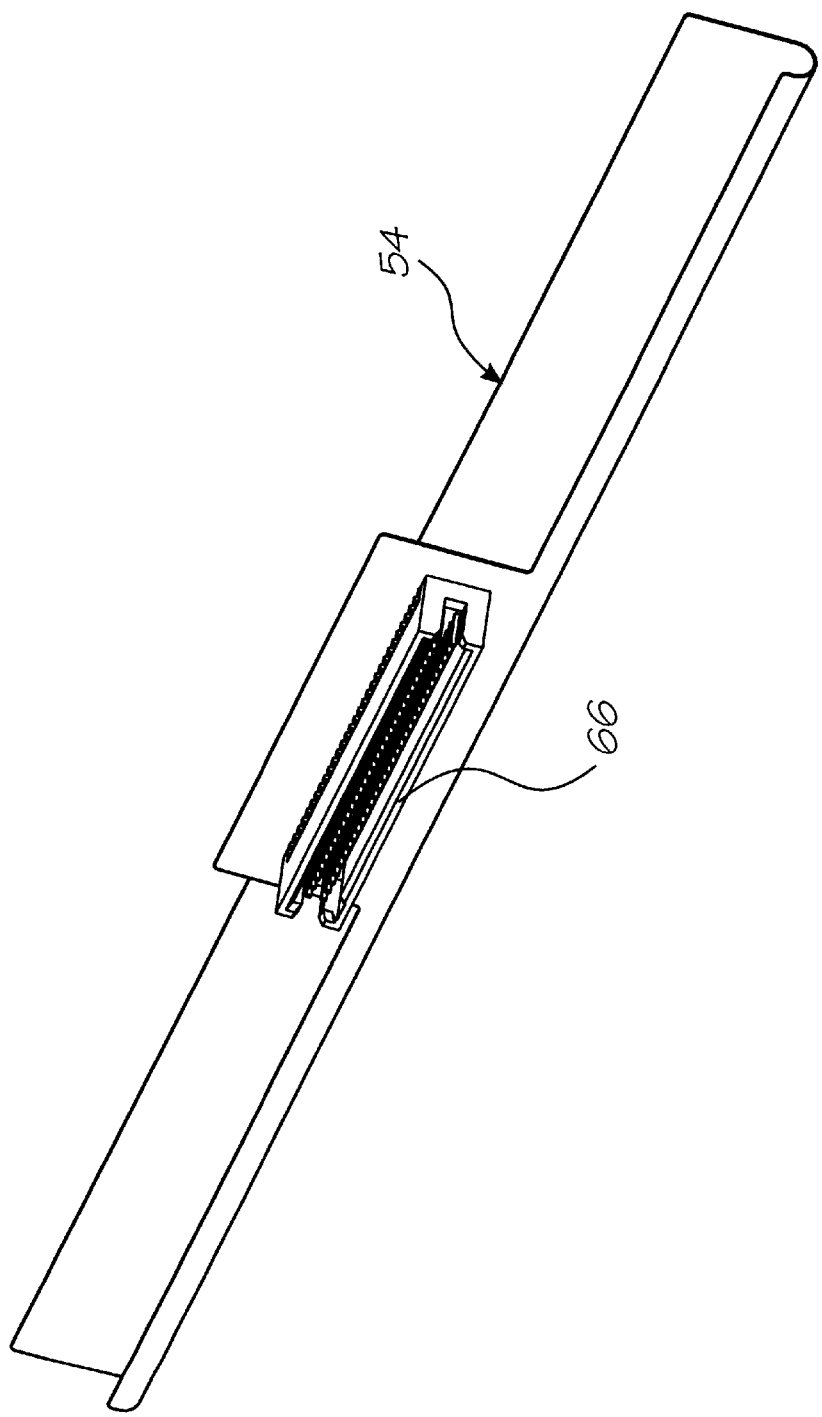
FIG. 13 shows a three dimensional view of a flexible printed circuit board of the assembly.

The TAB film 22 is a standard single sided TAB film comprised of polyimide and copper layers. A slot accommodates the Memjet chip 18. The TAB film 22 includes gold plated contact pads 48 that connect with a flexible printed circuit board (PCB) 54 (FIG. 13) of the assembly 10 and busbar contacts 56 (FIG. 14) of busbars 58 and 60 of the assembly 10 to get data and power respectively to the chip 18. Protruding bond wires are gold bumped, then bonded to bond pads of the Memjet chip 18.

The junction between the TAB film 22 and all the chip sidewalls has sealant applied to the front face in the first instance: The sub-assembly 24 is then turned over and sealant is applied to the rear junction. This is done to completely seal the chip 18 and the TAB film 22 together to protect electrical contact because the TAB film 22 forms the floor 34 of the ink chambers 30 in the printhead module 12.

Figure 7:
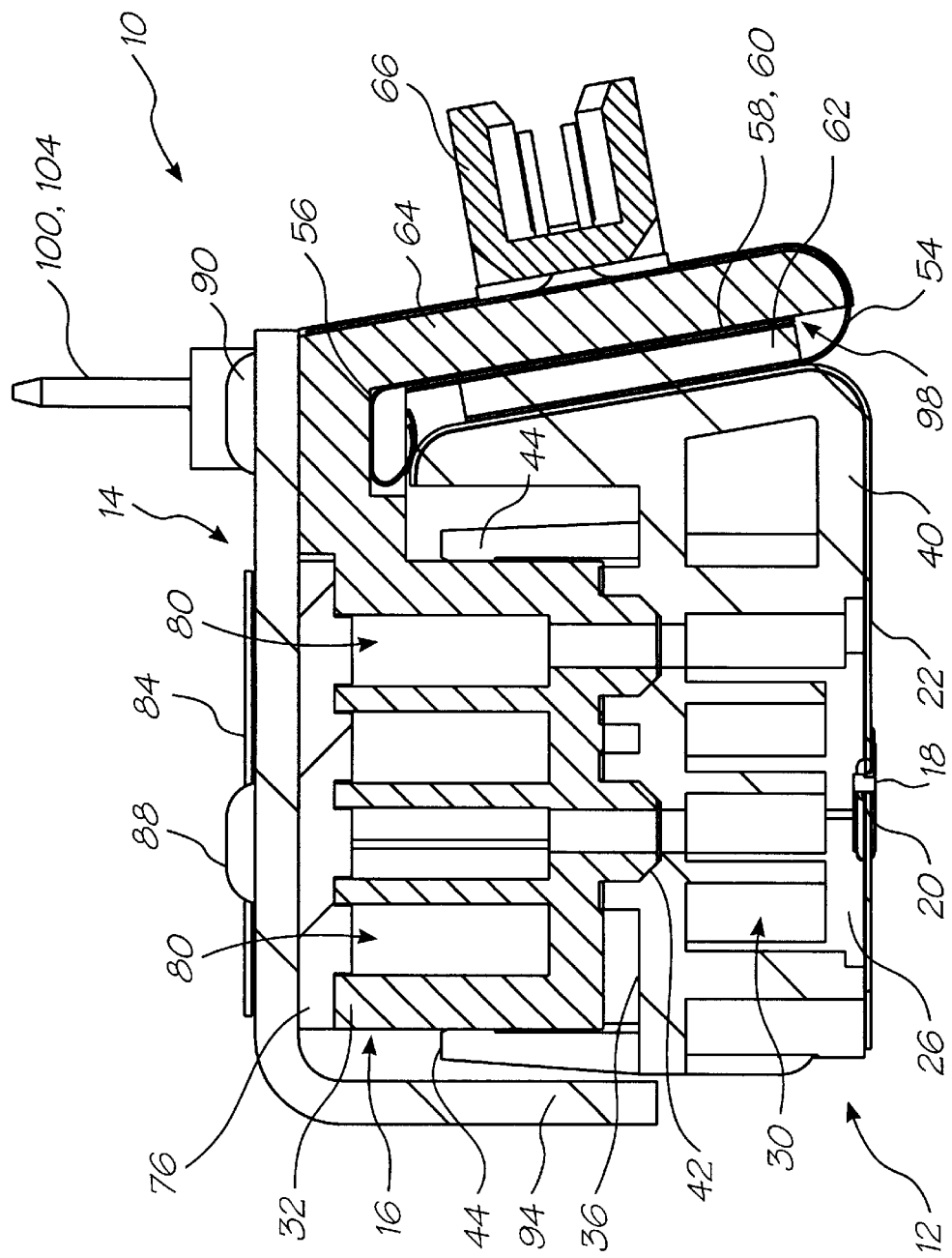
FIG. 7 shows, on the enlarged scale, a sectional end view of the assembly.

The flexible PCB 54 is a single sided component that supplies the TAB films 22 of each printhead module 12 with data connections through contact pads, which interface with corresponding contacts 48 on each TAB film 22. The flex PCB 54 is mounted in abutting relationship with the TAB film 22 along the angled sidewall 46 of the cover molding 28. The flex PCB 54 is maintained in electrical contact with the TAB film 22 of each printhead module 12 by means of a pressure pad 62 (FIG. 7). The PCB 54 wraps underneath and along a correspondingly angled sidewall 64 of the ink reservoir molding 32 of the ink reservoir 16. The part of the PCB 54 against the sidewall 64 carries a 62 pin connector 66.

The sidewall 64 of the ink reservoir molding 32 of the ink reservoir 16 is angled to correspond with the sidewall 32 of the cover molding 16 so that, when the printhead module 12 is mated to the ink reservoir 16, the contacts 48 of the TAB film 22 wipe against those of the PCB 54. The angle also allows for easy removal of the module 12. The flex PCB 54 is 'sprung' by the action of the deformable pressure pad 62 which allows for positive pressure to be applied and maintained between the contacts of the flex PCB 54 and the TAB film 22.

The micromolding 26 is a precision injection molding made of an Acetal type material. It accommodates the Memjet chip 18 (with the TAB film 22 already attached) and mates with the cover molding 28.

Rib details 68 (FIG. 8) in the underside of the micromolding 26 provide support for the TAB film 22 when they are bonded together. The TAB film 22 forms the floor 34 of the printhead module 12, as there is enough structural integrity due to the pitch of the ribs 68 to support a flexible film. The edges of the TAB film 22 seal on the underside walls of the cover molding 28.

The chip 18 is bonded on to 100 micron wide ribs 70 that run the length of the micromolding 26. A channel 72 is defined between the ribs 70 for providing the final ink feed into the nozzles of the Memjet chip 18.

The design of the micromolding 26 allows for a physical overlap of the Memjet chips 18 when they are butted in a line. Because the Memjet chips 18 now form a continuous strip with a generous tolerance, they can be adjusted digitally to produce the required print pattern, rather than relying on very close tolerance moldings and exotic materials to perform the same function. The pitch of the modules 12 is 20.33 mm.

The micromolding 26 fits inside the cover molding 28, the micromolding 26 bonding on to a set of vertical ribs 74 extending from the top 36 of the cover molding 28.

The cover molding 28 is a two shot, precision injection molding that combines an injected hard plastic body (Acetal) with soft elastomeric features (synthetic rubber). This molding interfaces with the sub-assembly 24 bonded to the micromolding 26. When bonded into place the base sub-assembly, comprising the sub-assembly 24 and the micromolding 26, mates with the vertical ribs 74 of the cover molding 28 to form the sealed ink chambers 30.

As indicated above, an opening of each chamber 30 is surrounded by one of the collars 40. These soft collars 40 are made of a hydrophobic, elastomeric compound that seals against the ink nozzles 42 of the ink reservoir 16. The snap fits 44 on the cover molding 28 locate the module 12 with respect to the ink reservoir 16.

Figure 12:
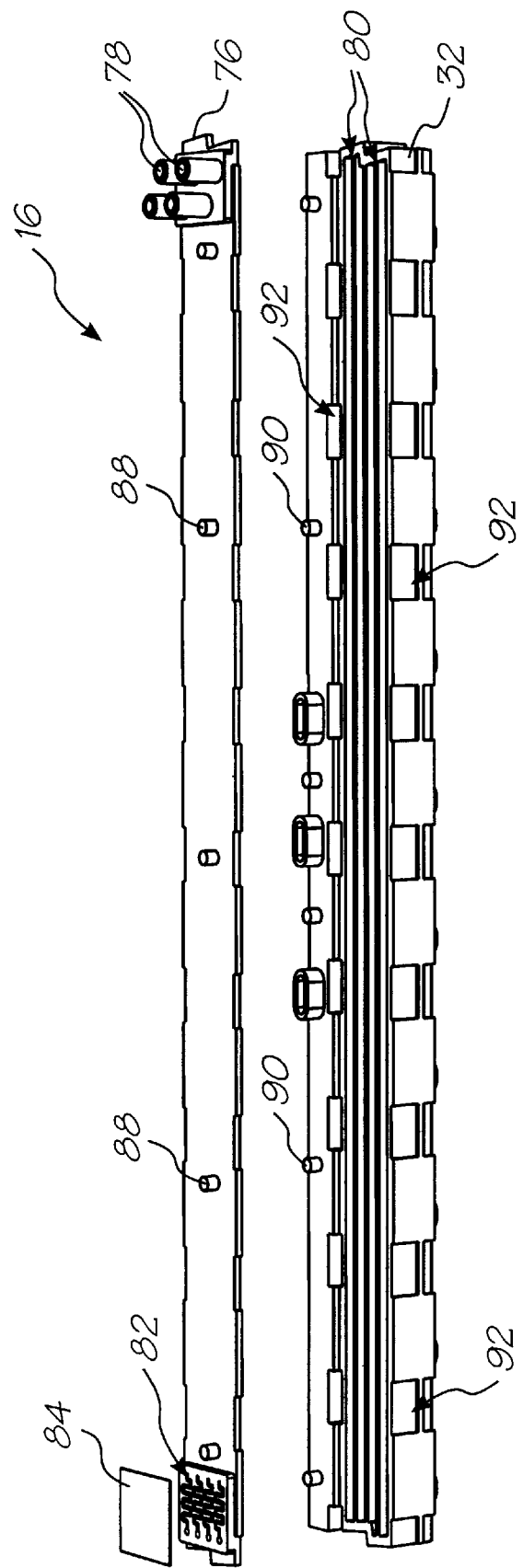
FIG. 12 shows a three dimensional, exploded view of an ink reservoir of the assembly.

The ink reservoir 16 comprises the ink reservoir molding 32 and a lid molding 76 (FIG. 7). The molding 32 is a simple four chamber injection molding with the lid molding 76 that is bonded on top to form a sealed environment for each color ink. Ink supply pipes 78 (FIG. 12) are arranged at one end of the lid molding 76 to communicate with ink channels 80 defined in the reservoir molding 32. Labyrinthine, hydrophobic air holes 82 are defined at an opposed end of the lid molding 76. The air holes 82 are included for bleeding the channels 80 during charging. These holes 82 are covered over with a self adhesive film 84 after charging.

The lid molding 76 has heat stakes 88, (pins that are designed to melt and hold the molding onto another part) which position and secure the ink reservoir 16 to the punched, sheet metal chassis 14. Additional heat stakes 90 are arranged along the reservoir molding 32. These stakes are shown after deformation in FIG. 1 of the drawings once the ink reservoir 16 has been secured to the chassis 14.

Receiving formations 92 are defined along the sides of the reservoir molding 32 for releasably receiving the clips 44 of the printhead modules 12.

As previously described, the sidewall 64 on the side of the reservoir molding 32 provides a mounting area for the flexible PCB 54 and data connector 66. The reservoir molding 32 also carries details for facilitating the accurate mounting of the V− and V+ busbars 58 and 60, respectively.

The metal chassis 14 is a precision punched, folded and plated metal chassis used to mount the printhead assembly 10 into various products. The ink reservoir 16 is heat staked to the chassis 14 via the heat stakes 88 and 90. The chassis 14 includes a return edge 94 for mechanical strength. The chassis 14 can be easily customized for printhead mounting and any further part additions. It can also be extended in length to provide multiple arrays of printhead assemblies 10 for wider format printers.

Slots 97 are defined in the chassis 14 for enabling access to be gained to the clips 44 of the modules 12 to release the modules 12 from the ink reservoir 16 for enabling replacement of one or more of the modules 12.

Figure 14:
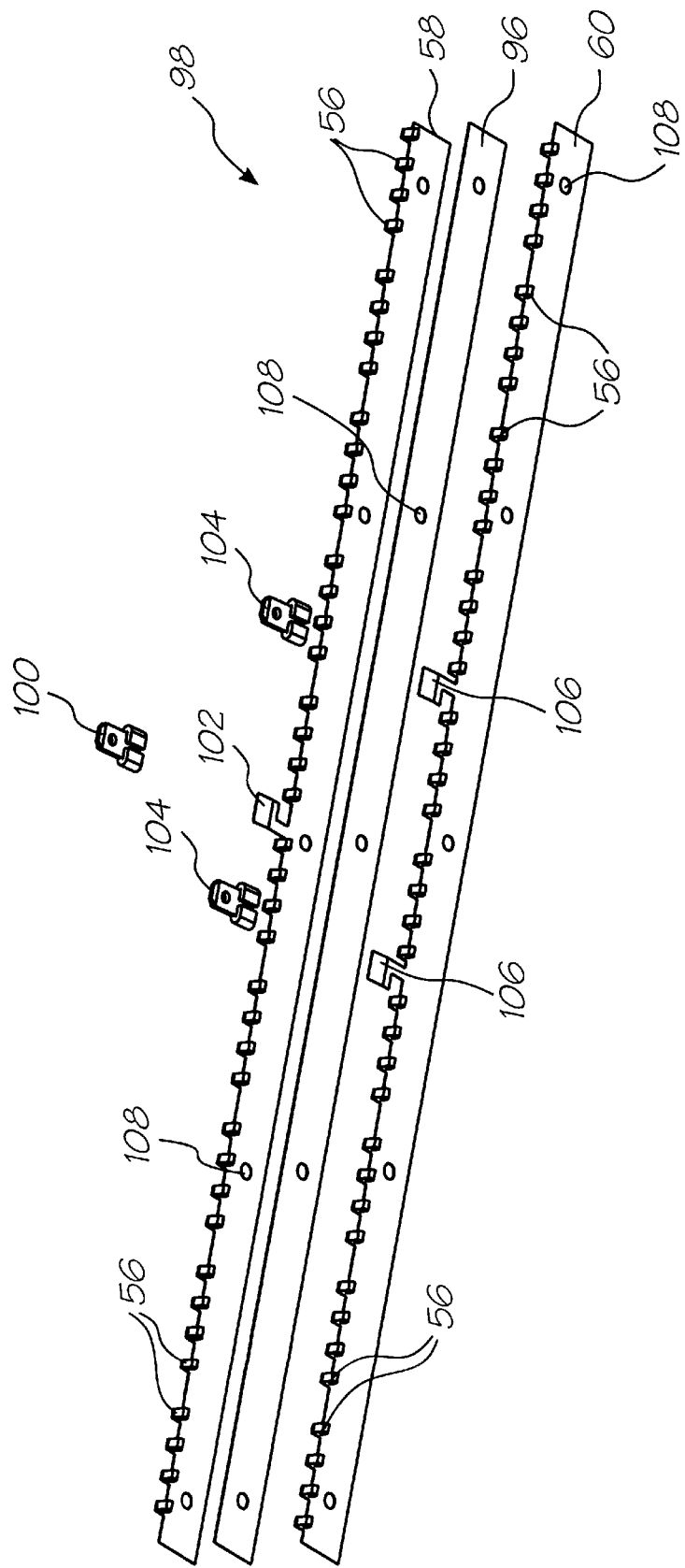
FIG. 14 shows a three dimensional, exploded view of a busbar arrangement of the assembly.

Thin finger strip metallic strip busbars 58 and 60 conduct V− and V+, respectively, to the TAB film 22 on each printhead module 12. The two busbars 58 and 60 are separated by an insulating strip 96 (FIG. 14). The flexible, finger-like contacts 56 are arranged along one side edge of each busbar 58, 60. The contacts 56 electrically engage the relevant contact pads 48 of the TAB film 22 of each module 12 for providing power to the module 12. The contacts 56 are separated by fine rib details on the underside of the ink reservoir molding 32.

A busbar sub-assembly 98, comprising the busbars 58, 60 and the insulating strip 96 is mounted on the underside of the sidewall 64 of the reservoir molding 32 of the ink reservoir 16. The sub-assembly is held captive between that sidewall 64 and the sidewall 46 of the cover molding 28 by the pressure pad 62.

A single spade connector 100 is fixed to a protrusion 102 on the busbar 58 for ground. Two spade connectors 104 are mounted on corresponding protrusions 106 on the busbar 60 for power. The arrangement is such that, when the sub-assembly 98 is assembled, the spade connectors 104 are arranged on opposite sides of the spade connector 100. In this way, the likelihood of reversing polarity of the power supply to the assembly 10, when the assembly 10 is installed, is reduced. During printhead module 12 installation or replacement, these are the first components to be disengaged, cutting power to the module 12.

To assemble the printhead assembly 10, a Memjet chip 18 is dry tested in flight by a pick and place robot, which also dices the wafer and transports individual chips 18 to a TAB film bonding area. When a chip 18 has been accepted, a TAB film 22 is picked, bumped and applied to the chip 18.

A slot in the TAB film 22 that accepts the chip 18 and has the adhesive 20, which also functions as a sealant, applied to the upper and lower surfaces around the chip 18 on all sides. This operation forms a complete seal with the side walls of the chip 18. The connecting wires are potted during this process.

The Memjet chip 18 and TAB film 22 sub-assembly 24 is transported to another machine containing a stock of micromoldings 26 for placing and bonding. Adhesive is applied to the underside of the fine ribs 70 in the channel 72 of the micromolding 26 and the mating side of the underside ribs 68 that lie directly underneath the TAB film 22. The sub-assembly 24 is mated with the micromolding 26.

The micromolding sub-assembly, comprising the micromolding 26 and the sub-assembly 24, is transported to a machine containing the cover moldings 28. When the micromolding sub-assembly and cover molding 28 are bonded together, the TAB film 22 is sealed on to the underside walls of the cover molding 28 to form a sealed unit. The TAB film 22 further wraps around and is glued to the sidewall 46 of the cover molding 28.

The chip 18, TAB film 22, micromolding 26 and cover molding 28 assembly form a complete Memjet printhead module 12 with four sealed independent ink chambers 30 and ink inlets 38.

The ink reservoir molding 32 and the cover molding 76 are bonded together to form a complete sealed unit. The sealing film 84 is placed partially over the air outlet holes 82 so as not to completely seal the holes 82. Upon completion of the charging of ink into the ink reservoir 16, the holes 82 are sealed by the film 84. The ink reservoir 16 is then placed and heat staked on to the metal chassis 14.

The full length flexible PCB 54 with a cushioned adhesive backing is bonded to the angled sidewall 64 of the ink reservoir 16. The flex PCB 54 terminates in the data connector 66, which is mounted on an external surface of the sidewall 64 of the ink reservoir 16.

Actuator V− and V+ connections are transmitted to each module 12 by the two identical metal finger strip busbars 58 and 60. The busbar sub-assembly 98 is mounted above the flex PCB 54 on the underside of the sidewall 64 of the ink reservoir molding 32. The busbars 58, 60 and the insulating strip 96 are located relative to the ink reservoir molding 32 via pins (not shown) projecting from the sidewall 64 of the ink reservoir molding 32, the pins being received through locating holes 108 in the busbars 58, 60 and the insulating strip 96.

The Memjet printhead modules 12 are clipped into the overhead ink reservoir molding 32. Accurate alignment of the module 12 to the reservoir molding 32 is not necessary, as a complete printhead assembly 10 will undergo digital adjustment of each chip 18 during final QA testing.

Each printhead module's TAB film 22 interfaces with the flex PCB 54 and busbars 58, 60 as it is clipped into the ink reservoir 16. To disengage a printhead module 12 from the reservoir 16, a custom tool is inserted through the appropriate slots 97 in the metal chassis 14 from above. The tool fingers' slide down the walls of the ink reservoir molding 32, where they contact the clips 44 of the cover molding 28. Further pressure acts to ramp the four clips 44 out of engagement with the receiving formations 92 and disengage the printhead module 12 from the ink reservoir 16.

To charge the ink reservoir 16 with ink, hoses 110 (FIG. 3) are attached to the pipes 78 and filtered ink from a supply is charged into each channel 80. The openings 82 at the other end of the ink reservoir cover molding 76 are used to bleed off air during priming. The openings 82 have tortuous ink paths that run across the surface, which connect through to the internal ink channels 80. These ink paths are partially sealed by the bonded transparent plastic film 84 during charging. The film 84 serves to indicate when inks are in the ink channels 80, so they can be fully capped off when charging has been completed.

For electrical connections and testing, power and data connections are made to the flexible PCB 54. Final testing then commences to calibrate the printhead modules 12. Upon successful completion of the testing, the Memjet printhead assembly 10 has a plastic sealing film applied over the underside that caps the printhead modules 12 and, more particularly, their chips 18, until product installation.

It is to be noted that there is an overlap between adjacent modules 12. Part of the testing procedure determines which nozzles of the overlapping portions of the adjacent chips 18 are to be used.

Figure 15:
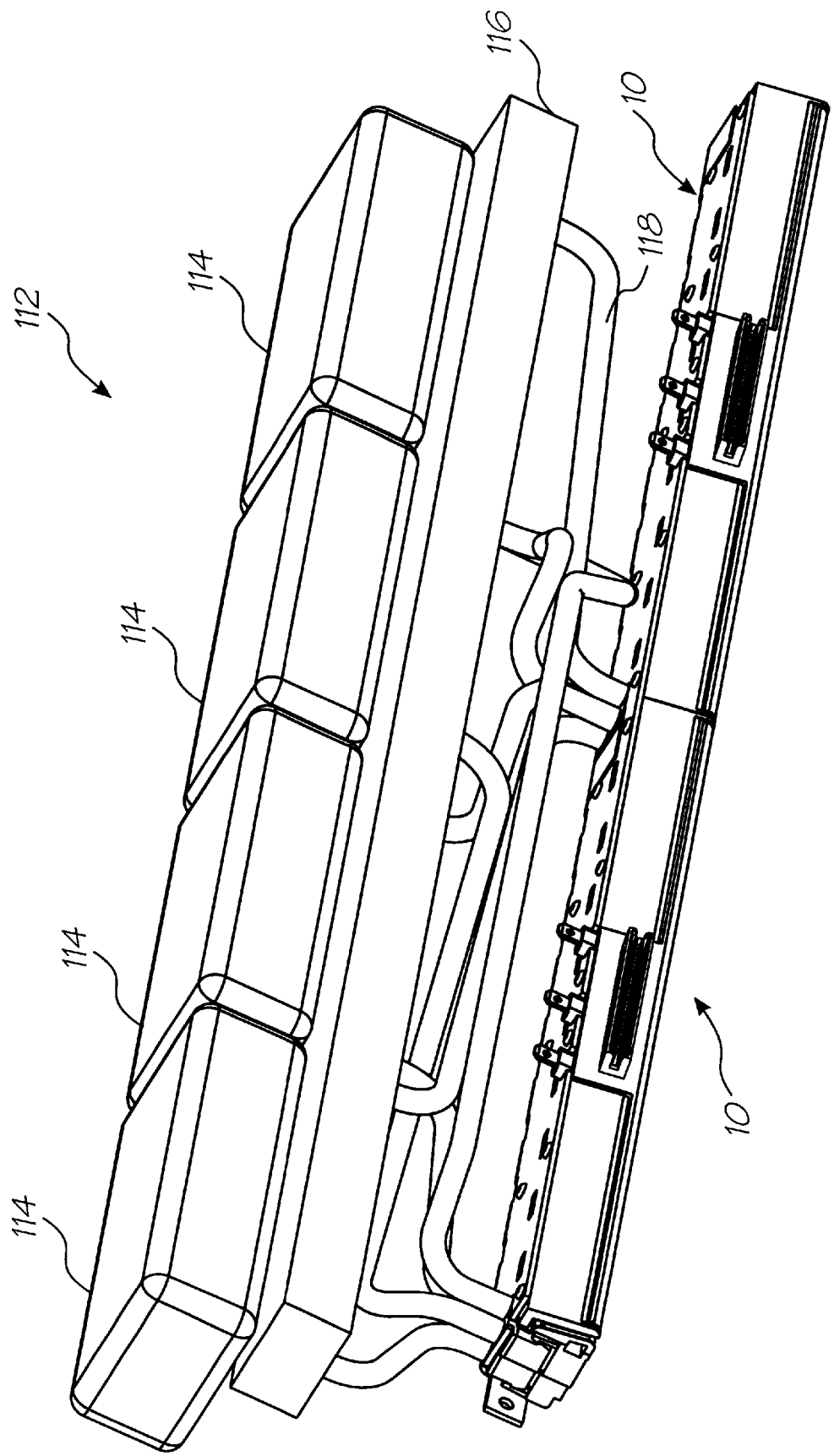
FIG. 15 shows a three dimensional view of a multiple printhead assembly configuration.
Figure 16:
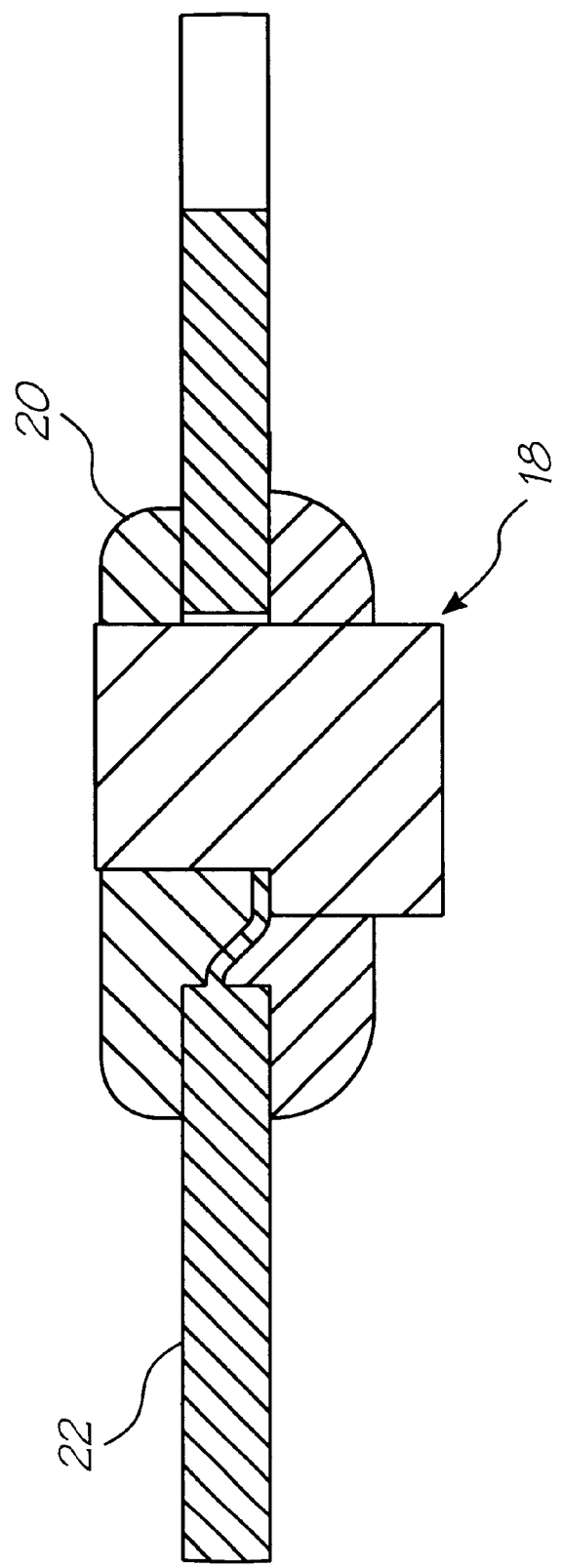
FIG. 16 shows, on an enlarged scale, a sectional side view of the bonding of the printhead chip to the TAB film.

As shown in FIG. 15 of the drawings, the design of the modular Memjet printhead assemblies 10 allows them to be butted together in an end-to-end configuration. It is therefore possible to build a multiple.printhead system 112 in, effectively, unlimited lengths. As long as each printhead assembly 10 is fed with ink, then it is entirely possible to consider printhead widths of several hundred feet. This means that the only width limit for a Memjet printer product is the maximum manufacturable size of the intended print media.

FIG. 15 shows how a multiple Memjet printhead system 112 could be configured for wide format printers. Replaceable ink cartridges 114, one for each color, are inserted into an intermediate ink reservoir 116 that always has a supply of filtered ink. Hoses 118 exit from the underside of the reservoir 118 and connect up to the ink inlet pipes 78 of each printhead assembly 10.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

We claim:

1. A component for a printhead module, the component including
   a printhead chip;
   a flexible circuit connector on which the chip is mounted; and
   a carrier having fluid communication channels defined therein for supplying ink to the chip, the flexible circuit connector being bonded to the carrier in a liquid tight manner so that the flexible circuit connector forms a wall of an ink supply chamber of the printhead module, the ink supply chamber being at least partially defined by the fluid communication channels.

2. The component as claimed in claim 1 in which the chip is a microelectromechanical chip comprised of a plurality of nozzles.

3. The component as claimed in claim 1 in which the flexible circuit connector is at least partially defined by a film member on which are arranged a plurality of electrically conductive pathways, contacts and connections for providing power and data signals to the chip.

4. The component as claimed in claim 3 in which the film member is a Tape Automated Bond (TAB) film.

5. The component as claimed in claim 1 in which the carrier, with the flexible circuit connector bonded thereto, forms a floor of the ink supply chamber.

6. The component as claimed in claim 1 in which the carrier is a rigid structure having flow paths defined therein.

7. The component as claimed in claim 6 in which the carrier comprises a frame from which a plurality of ribs extend to define a pair of opposed comb-like structures and a central, longitudinally extending channel between the structures in which the chip is received.

8. The component as claimed in claim 1 in which the chip is bonded sealingly to the flexible circuit connector on both sides of the flexible circuit connector.

\* \* \* \* \*